(12) United States Patent
Aggarwal et al.

(10) Patent No.: US 10,628,790 B1
(45) Date of Patent: Apr. 21, 2020

(54) AUTOMATED FLOOR EXPANSION USING AN UNMANNED FIDUCIAL MARKER PLACEMENT UNIT

(71) Applicant: Amazon Technologies, Inc., Seattle, WA (US)

(72) Inventors: Aayush Aggarwal, Medford, MA (US); Amanda Adkins, Medford, MA (US); Vishnu Ayyagari, Boxboro, MA (US); Sidney Yu-Heng Ng, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 15/698,035

(22) Filed: Sep. 7, 2017

(51) Int. Cl.
*G06Q 10/08* (2012.01)
*G06Q 10/04* (2012.01)
*G06Q 50/28* (2012.01)
*G05D 1/02* (2020.01)

(52) U.S. Cl.
CPC ......... *G06Q 10/087* (2013.01); *G05D 1/0217* (2013.01); *G05D 1/0234* (2013.01); *G05D 2201/0216* (2013.01); *G06Q 10/047* (2013.01); *G06Q 50/28* (2013.01)

(58) Field of Classification Search
CPC .............. G05D 1/0217; G05D 1/0234; G05D 2201/0216; G06Q 50/28; G06Q 10/087
See application file for complete search history.

(56) References Cited

U.S. PATENT DOCUMENTS

| 8,280,547 | B2 | 10/2012 | D'Andrea et al. |
| 9,087,314 | B2 | 7/2015 | Hoffman et al. |
| 9,152,149 | B1 * | 10/2015 | Palamarchuk ....... G05D 1/0234 |
| 9,427,874 | B1 * | 8/2016 | Rublee .................. B25J 9/1697 |

* cited by examiner

*Primary Examiner* — Navid Ziaeianmehdizadeh
*Assistant Examiner* — Akram A Manshalin
(74) *Attorney, Agent, or Firm* — Kilpatrick Townsend & Stockton LLP

(57) ABSTRACT

Methods and related systems employ an unmanned fiducial marker application unit to deploy new fiducial markers to a floor of a material handling facility, such as an inventory facility. A system for managing inventory items includes an unmanned fiducial marker application unit, initial fiducial markers distributed in a pattern on a floor of an inventory facility, at least one tangible memory device, and at least one processor configured to receive new fiducial marker data indicative of a location for each of one or more new fiducial markers to be applied to the floor and instruct the unmanned fiducial marker application unit to apply at least one of the one or more new fiducial markers to the floor in accordance with the new fiducial marker data.

17 Claims, 9 Drawing Sheets

US 10,628,790 B1

AUTOMATED FLOOR EXPANSION USING AN UNMANNED FIDUCIAL MARKER PLACEMENT UNIT

BACKGROUND

Modern material handling systems, such as those in mail order warehouses, supply chain distribution centers, airport luggage systems, and manufacturing facilities, face significant challenges in responding to requests for material storage, transportation, and handling. As material handling systems grow, the challenges of space utilization of system resources, including space, equipment, and manpower, can result in lower throughput, unacceptably long response times, an ever-increasing backlog of unfinished tasks, and, in general, poor system performance. Additionally, expanding or reducing the size or capabilities of many material handling systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
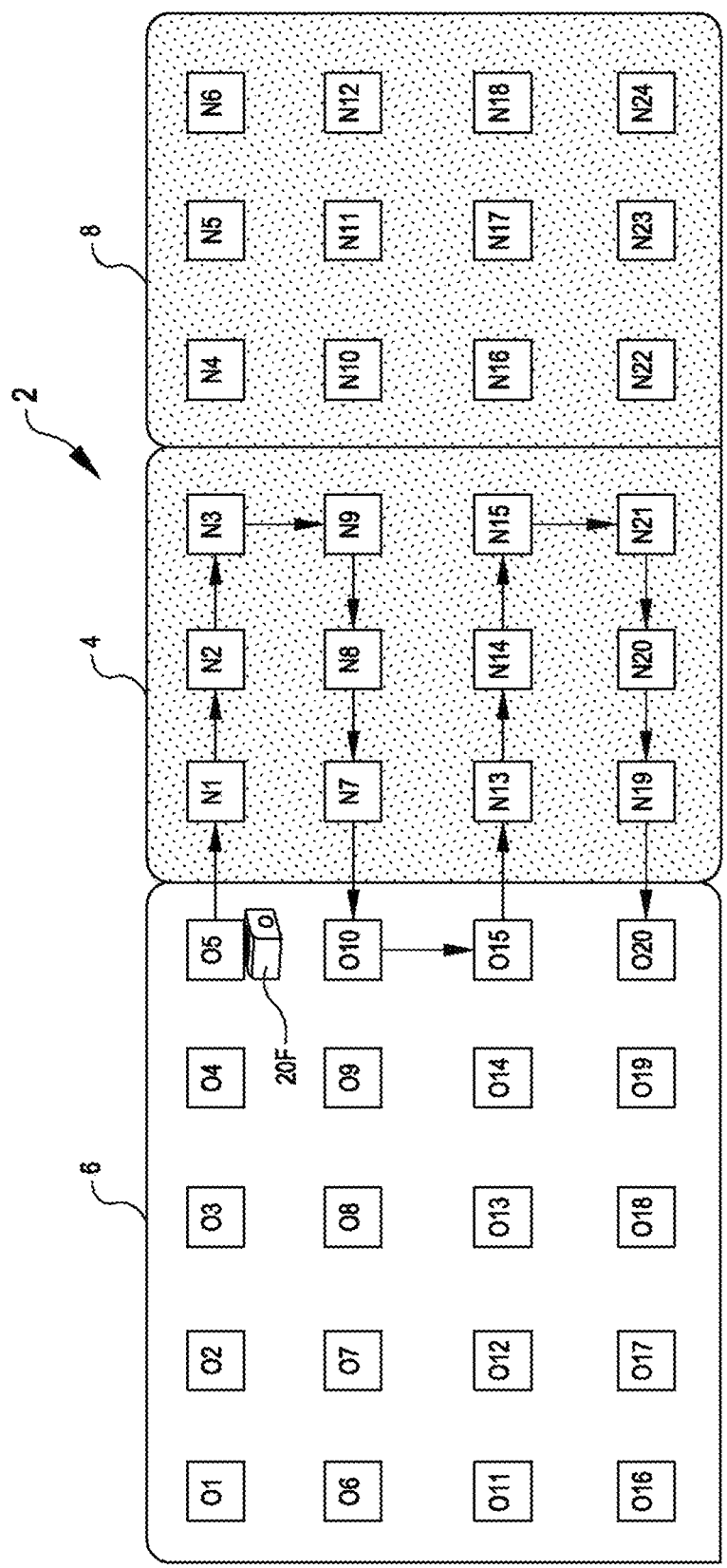
FIG. 1 is a simplified schematic diagram illustrating automated application of fiducial markers to a floor expansion area in a material handling facility such as an inventory facility, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a material handling system, e.g., an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

Methods and systems described herein employ an unmanned fiducial marker application unit(s) to apply one or more new fiducial markers to a floor of the material handling facility. By employing an unmanned fiducial marker application unit(s) to apply the one or more new fiducials, a material handling facility can be expanded in an automated manner, thereby tending to reduce disruption associated with expansion of the material handling facility.

In many applications, the fiducial markers facilitate navigation of unmanned drive units used to move material and/or inventory items within a material handling facility. In such applications, the unmanned drive units can include an image capture device used to capture an image of the floor that encompasses one or more of the fiducial markers. The image is processed to detect any fiducial marker(s) in the image. The image can be processed to determine fiducial marker information for each detected fiducial marker, including the position of the fiducial marker within the image, the orientation of the fiducial marker within the image, and/or the identity of the fiducial marker. The fiducial marker information is then processed with reference to fiducial marker location data amounting to a virtual map of all the fiducial markers within the facility to determine the position, and in some embodiments the orientation, of the unmanned drive unit (when the image was captured) in the facility. The determined location can be used to facilitate navigation of the unmanned drive unit within the facility.

In many existing applications, when a material handling facility is expanded, someone physically installs new fiducial markers on the added floor region and revised fiducial marker location data is generated (e.g., by adding fiducial marker location data for the new fiducial markers to the existing fiducial marker location data for the initial fiducial markers) and used by the material handling system or inventory system to process the captured image to locate the unmanned drive unit within the facility. In order to enable this manual intervention, the entire system, or particular areas, must be made off limits to the drive units in order to protect the safety of the workers setting up the expanded area for use. As such, regular operation of the system is impacted during the installation process. By using an unmanned fiducial marker application unit(s) to apply the one or more new fiducial markers to the floor in conjunction with a staged deployment of the revised fiducial location data, the material handling facility can be expanded in an automated manner without shutting down or taking portions of the space off-line, and with little if any manual intervention.

Turning now to the drawings in which the same reference numbers are used to refer to the same or similar elements, FIG. 1 illustrates automated application of new fiducial markers N1 through N24 to floor expansion areas 4, 8 in a material handling facility 2 such as an inventory facility, in accordance with some embodiments. In the illustrated example, starting with an initial configuration of the material handling facility 2 having an initial floor area 6 with initial fiducial markers O1 through O20 distributed on the initial floor area 6, initial fiducial marker data indicative of the position and orientation of the initial fiducial markers on the initial floor area 6, relative to a suitable reference coordinate system, is used to process an image of the initial floor area 6 captured by an unmanned drive unit to determine the position and orientation of the unmanned drive unit within the material handling facility 2. To revise the material handling facility 2 to add the floor expansion areas 4, 8, a staged process can be used to transition from the initial configuration of the material handling facility 2 to the desired revised configuration.

The staged process can including using transitional fiducial marker data indicative of the position and orientation in which the new fiducial markers are to be placed in the floor expansion areas 4, 8. In some embodiments, the transitional fiducial marker data is also indicative of the deployment status of each of the new fiducial markers N1 through N24. In some embodiments, the transitional fiducial marker data is indicative of the position and orientation of each of a selected subset of the initial fiducial markers O1 through O20. Prior to the placement of any of the new fiducial markers N1 through N24 to the floor expansion areas 4, 8, the transitional fiducial marker data can indicate, for each of the new fiducial markers, that the respective new fiducial marker has not been placed on the floor of the material handling facility 2. In some embodiments, operation of the material handling facility 2 is at least partially controlled via a material handling system including one or more processors and one or more tangible memory devices storing non-transitory instructions executable by the one or more processors to control automated aspects of the operation of the facility 2. The staged process can include processing of the transitional fiducial marker data, by the material handling system, to identify all of the new fiducial markers that have not yet been placed on the floor of the material handling facility 2. The material handling system can then instruct one or more unmanned fiducial marker placement units 20F to move to the location designated for the respective new fiducial marker and apply the new fiducial marker to the designated location in the designated orientation. Subsequent to placement of each of the new fiducial markers, the transitional fiducial marker data can be updated to indicate that the respective new fiducial marker has been placed on the floor of the material handling facility 2 and is available to be imaged by an unmanned drive unit and the resulting image processed to determine the location and orientation of the unmanned drive unit within the material handling facility 2.

As described in more detail below, prior to placement of one or more of the new fiducial markers onto the floor of the material handling facility 2, the location and orientation of the unmanned fiducial marker placement unit(s) 20F used to place the new fiducial markers onto the floor expansion areas 4, 8 can be determined by capturing an image of one or more of the initial fiducial markers O1 through O20 via an image capture device mounted to the unmanned fiducial marker placement unit 20F. The captured image can then be processed to detect a subset of the initial fiducial markers O1 through O20 encompassed in the captured image, determine the location and orientation of the initial fiducial marker within the captured image, identify the initial fiducial marker in the captured image, and determine the position and orientation of the unmanned fiducial marker placement unit 20F within the material handling facility 2 based on the location, orientation, and identify of the fiducial marker in the captured image and the corresponding location and orientation of the identified initial fiducial marker in the material handling facility 2 as indicated by the transitional fiducial marker data. For example, as illustrated in FIG. 1, prior to the placement of new fiducial markers N1, N2, N3, N9, N8, and N7, the unmanned fiducial marker placement unit 20F used to place the new fiducial markers N1, N2, N3, N9, N8, and N7 can be instructed to move to initial fiducial marker O5 and capture an image of the floor that encompasses initial fiducial marker O5. The captured image of the floor that encompasses initial fiducial marker O5 can then be processed to determine the position and orientation of the unmanned fiducial marker placement unit 20F within the material handling facility 2. The unmanned fiducial marker placement unit 20F can then be instructed to move relative to initial fiducial marker O5 to the position and orientation required for placement of new fiducial marker N1 on the floor expansion area 4 as indicated by the transitional fiducial marker data. After placing new fiducial marker N1 on the floor expansion area 4, the unmanned fiducial marker placement unit 20F can then move to sequentially place new fiducial markers N2, N3, N9, N8, and N7. In many embodiments, the unmanned fiducial marker placement unit 20F is configured to track changes in its position and orientation via encoders that track angular motion of drive shafts used to propel and reorient the unmanned fiducial marker placement unit 20F.

Subsequent to the placement of one or more of the new fiducial markers, the unmanned fiducial marker placement unit 20F can be instructed to move to one of the initial fiducial markers to check how well the position and orientation of the unmanned fiducial marker placement unit 20F as tracked by the drive shaft encoders compares with a position and orientation of the unmanned fiducial marker placement unit 20F as determined via processing an image encompassing one of the initial fiducial markers. For example, as shown in FIG. 1, subsequent to the placement of new fiducial markers N1, N2, N3, N9, N8, and N7, the unmanned fiducial marker placement unit 20F can be commanded to move to initial fiducial marker O10 and capture an image encompassing initial fiducial marker O10 for processing to determine the location and orientation of the unmanned fiducial marker placement unit 20F within the material handling facility 2. The location and orientation of the unmanned fiducial marker placement unit 20F determined via processing the captured image encompassing initial fiducial marker O10 can be compared with the location and orientation of the unmanned fiducial marker placement unit 20F as tracked from initial fiducial marker O5 as a check on the accuracy of the placement of new fiducial markers N1, N2, N3, N9, N8, and N7. If the tracked location/orientation of the unmanned fiducial marker placement unit 20F at the initial fiducial marker O10 relative to the starting point from initial fiducial marker O5 matches the location/orientation of the unmanned fiducial marker placement unit 20F determined via processing of the captured image encompassing initial fiducial marker O10 within a suitable tolerance, it is assumed that placement of the new fiducial markers N1, N2, N3, N9, N8, and N7 occurred based on sufficiently accurate location/orientation tracking by the unmanned fiducial marker placement unit 20F. In a similar fashion, the unmanned fiducial marker placement unit 20F can be moved to initial fiducial marker O15 and capture an image of initial fiducial marker O15 that is processed to determine the location/orientation of the unmanned fiducial marker placement unit 20F prior to moving the unmanned fiducial marker placement unit 20F to sequentially apply new fiducial markers N13, N14, N15, N21, N20, and N19. After applying new fiducial markers N13, N14, N15, N21, N20, and N19, the unmanned fiducial marker placement unit 20F can be moved to initial fiducial marker O20 to capture an image encompassing initial fiducial marker O20 for processing to determine the location and orientation of the unmanned fiducial marker placement unit 20F within the material handling facility 2. The location and orientation of the unmanned fiducial marker placement unit 20F within the material handling facility 2 determined via processing the captured image encompassing initial fiducial marker (O20) can be compared with the location and orientation of the unmanned fiducial marker placement unit 20F as tracked from initial fiducial marker O15 as a check on the accuracy of the placement of new fiducial markers N13, N14, N15, N21, N20, and N19.

The floor area of the material handling facility 2 can also be expanded in any suitable number of stages. For example, as illustrated in FIG. 1, the inventory facility can be first be expanded to add floor expansion area 4 to the initial floor area 6 using the approaches described herein. Following the placement of new fiducial markers N1, N2, N3, N9, N8, N7, N13, N14, N15, N21, N20, and N19 in floor expansion area 4, the material handling facility 2 can be further expanded to add floor expansion area 8 by placing new fiducial markers N4, N5, N6, N12, N11, N10, N16, N17, N18, N24, N23, and N22 in the floor expansion area 8 using, for example, an approach similar to the approach described herein with respect to the placement of new fiducial markers N1, N2, N3, N9, N8, N7, N13, N14, N15, N21, N20, and N19 in floor expansion area 4.

Figure 2:
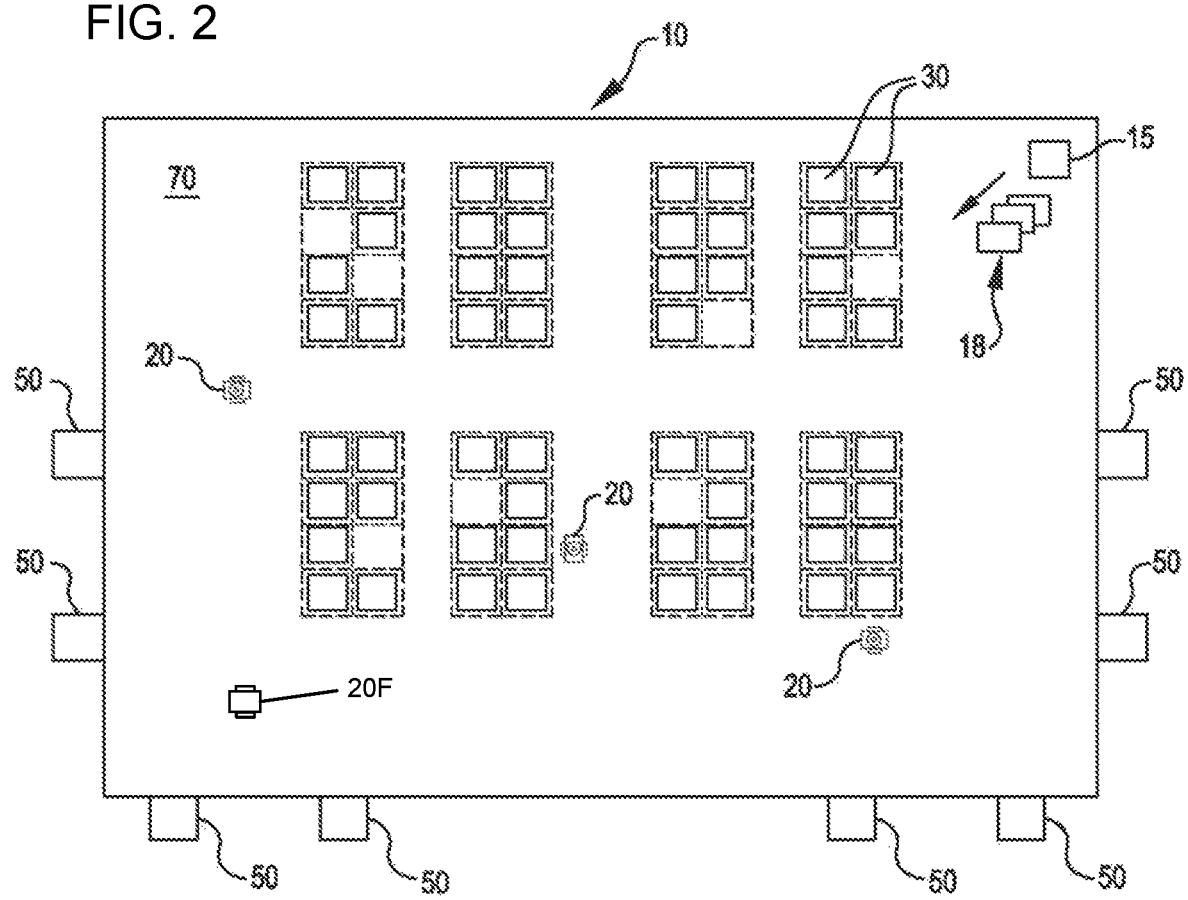
FIG. 2 illustrates components of an inventory system that can be expanded using the approach illustrated in FIG. 1.

FIG. 2 illustrates the contents of an example of an inventory system 10. The example inventory system 10 includes a management module 15, one or more mobile drive units 20, one or more of the unmanned fiducial marker placement units 20F, one or more inventory holders 30, and one or more inventory stations 50. The mobile drive units 20 transport the inventory holders 30 between points within a workspace 70 in response to commands communicated by the management module 15. Each of the inventory holders 30 stores one or more types of inventory items. The one or more unmanned fiducial marker placement units 20F are operable to place new fiducial markers onto the floor of the material handling facility 2 to, for example, expand or otherwise revise the workspace 70. The inventory system 10 is capable of moving inventory items between locations within the workspace 70 to facilitate the entry, processing, and/or removal of inventory items from the inventory system 10 and the completion of other tasks involving inventory items.

The management module 15 assigns tasks to appropriate components of the inventory system 10 and coordinates operation of the various components in completing the tasks. These tasks may relate not only to the movement and processing of inventory items, but also to the management and maintenance of the components of the inventory system 10. For example, the management module 15 may assign portions of workspace 70 as parking spaces for the mobile drive units 20 and the one or more of the unmanned fiducial marker placement units 20F, the scheduled recharge or replacement of mobile drive unit batteries, the storage of empty inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20, the one or more of the unmanned fiducial marker placement units 20F, and/or other elements of the inventory system 10. As a result, any or all of the interaction between a particular mobile drive unit 20 and the management module 15 and/or between a particular unmanned fiducial marker placement unit 20F and the management module 15 that is described below may, in particular embodiments, represent peer-to-peer communication between the particular unit 20, 20F and one or more other units 20, 20F. The contents and operation of an example embodiment of management module 15 are discussed further below with respect to FIG. 3.

The mobile drive units 20 move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular embodiment of the inventory system 10, the mobile drive units 20 and the one or more unmanned fiducial marker placement units 20F represent independent, self-powered devices configured to freely move about the workspace 70. In alternative embodiments, the mobile drive units 20 represent elements of a tracked inventory system configured to move the inventory holder 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10, the mobile drive units 20 and/or the one or more unmanned fiducial marker placement units 20F may be configured to use alternative conveyance equipment to move within the workspace 70 and/or between separate portions of the workspace 70. The contents and operation of an example embodiment of the mobile drive unit 20 are discussed further below with respect to FIGS. 4 and 5. The content and operation of an example embodiment of the unmanned fiducial marker placement unit 20F are discussed further below with respect to FIGS. 13 and 14.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The one or more unmanned fiducial marker placement units 20F may be capable of communicating with the management module to receive information identifying the location and orientation for placement of the new fiducial markers, transmit image data for images of fiducial markers captured by the unmanned fiducial marker placement unit 20F for processing by the management module 15, to receive data indicating the position and orientation of the unmanned fiducial marker placement unit 20F determined via processing of the image data, to transmit data indicating placement of one or more of the new fiducial markers onto the floor of the material handling facility 2, or exchange any other suitable information to be used by the management module 15 or the unmanned fiducial marker placement unit 20F during operation. The mobile drive units 20 and/or the fiducial marker placement units 20F may communicate with management module 15 wirelessly, using wired connections between the mobile drive units 20 and/or the fiducial marker placement units 20F and the management module 15, and/or in any other appropriate manner. As one example, particular embodiments of the mobile drive unit 20 and/or the fiducial marker placement units 20F may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20 and/or the fiducial marker placement units 20F. Thus, for the purposes of this description and the claims that follow, communication between management module 15 and a particular mobile drive unit 20 and/or the particular fiducial marker placement unit 20F may represent communication between components of a particular mobile drive unit 20 and/or a particular fiducial marker placement unit 20F. In general, the mobile drive units 20 and/or the unmanned fiducial marker placement unit(s) 20F may be powered, propelled, and controlled in any manner appropriate based on the configuration and characteristics of the inventory system 10.

The inventory holders 30 store inventory items. In a particular embodiment, the inventory holders 30 include multiple storage bins with each storage bin capable of holding one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving one of the inventory holders 30.

Additionally, in particular embodiments, the inventory items 40 may also hang from hooks or bars (not shown) within or on the inventory holder 30. In general, the inventory holder 30 may store inventory items 40 in any appropriate manner within the inventory holder 30 and/or on the external surface of the inventory holder 30.

Additionally, each of the inventory holders 30 may include a plurality of faces, and each bin may be accessible through one or more faces of the inventory holder 30. For example, in a particular embodiment, the inventory holder 30 includes four faces. In such an embodiment, bins located at a corner of two faces may be accessible through either of those two faces, while each of the other bins is accessible through an opening in one of the four faces. The mobile drive unit 20 may be configured to rotate the inventory holder 30 at appropriate times to present a particular face and the bins associated with that face to an operator or other components of the inventory system 10.

Inventory items represent any objects suitable for storage, retrieval, and/or processing in the automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50. The inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, the inventory stations 50 may just represent the physical locations where a particular task involving inventory items can be completed within the workspace 70. In alternative embodiments, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks to inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 2 shows, for the purposes of illustration, an embodiment of the inventory system 10 in which the workspace 70 includes a fixed, predetermined, and finite physical space, particular embodiments of the inventory system 10 may include mobile drive units 20 and inventory holders 30 that are configured to operate within a workspace 70 that is of variable dimensions and/or an arbitrary geometry. While FIG. 2 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, the one or more fiducial marker placement units 20F, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the management module 15 generates task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate task assignments 18 independently of such inventory requests, as part of the overall management and maintenance of the inventory system 10. For example, the management module 15 may generate task assignments 18 in response to the occurrence of a particular event (e.g., in response to a unit 20, 20F requesting a space to park, a revision of the workspace 70 including installation of new fiducial markers onto a portion of the revised workspace 70), according to a predetermined schedule (e.g., as part of a daily start-up routine), or at any appropriate time based on the configuration and characteristics of the inventory system 10. After generating one or more task assignments 18, the management module 15 transmits the generated task assignments 18 to appropriate components for completion of the corresponding task. The relevant components then execute their assigned tasks.

With respect to the mobile drive units 20 and/or the one or more fiducial marker placement units 20F specifically, the management module 15 may, in particular embodiments, communicate task assignments 18 to selected mobile drive units 20 or selected fiducial marker placement unit 20F that identify one or more destinations for the selected mobile drive units 20 or the selected fiducial marker placement unit 20F. The management module 15 may select a mobile drive unit 20 or fiducial marker placement unit 20F to assign the relevant task based on the location or state of the selected unit 20, 20F, an indication that the selected unit 20, 20F has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the unit 20, 20F should park until receiving another task, the position(s) and orientation(s) for a fiducial marker(s) to be placed by a selected fiducial marker placement unit 20F, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to a particular unit 20, 20F, and/or any other appropriate considerations.

As part of completing these tasks, the mobile drive units 20 may dock with and transport inventory holders 30 within workspace 70. The mobile drive units 20 may dock with inventory holders 30 by connecting to, lifting, and/or otherwise interacting with the inventory holders 30 in any other suitable manner so that, when docked, the mobile drive unit 20 is coupled to and/or supports the inventory holder 30 and can move the inventory holder 30 within the workspace 70. While the description below focuses on particular embodiments of the mobile drive unit 20 and the inventory holder 30 that are configured to dock in a particular manner, alternative embodiments of the mobile drive unit 20 and the inventory holder 30 may be configured to dock in any manner suitable to allow the mobile drive unit 20 to move an inventory holder 30 within the workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with relevant components of the inventory system 10 to ensure the efficient use of space, equipment, manpower, and other resources available to the inventory system 10. As one specific example of such interaction, the management module 15 is responsible, in particular embodiments, for planning the paths mobile drive units 20 and/or the fiducial marker placement unit(s) 20F take when moving within the workspace 70 and for allocating use of a particular portion of the workspace 70 to a particular unit 20, 20F for purposes of completing an assigned task. In such embodiments, the units 20, 20F may, in response to being assigned a task, request a path to a particular destination associated with the task. Moreover, while the description below focuses on one or more embodiments in which the unit 20, 20F requests paths from the management module 15, the unit 20, 20F may, in alternative embodiments, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits.

Figure 3:
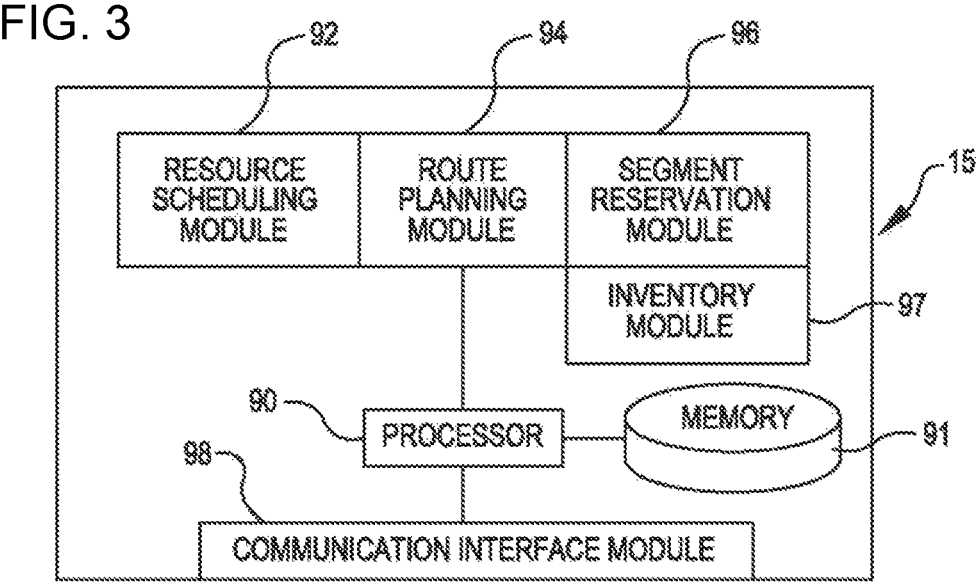
FIG. 3 illustrates in greater detail the components of an example management module that can be used in the inventory system shown in FIG. 2.

FIG. 3 illustrates in greater detail the components of a particular embodiment of the management module 15. As shown, the example embodiment includes a resource scheduling module 92, a route planning module 94, a segment reservation module 96, an inventory module 97, a communication interface module 98, a processor 90, and a memory 91. The management module 15 may represent a single component, multiple components located at a central location within the inventory system 10, or multiple components distributed throughout the inventory system 10. For example, the management module 15 may represent components of one or more of the units 20, 20F that are capable of communicating information between the units 20, 20F and coordinating the movement of the units 20, 20F within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits (ASICs), field programmable gate arrays (FPGAs), digital signal processors (DSPs) and any other suitable specific or general purpose processors.

The memory 91 stores processor instructions, inventory requests, reservation information, state information for the various components of the inventory system 10 and/or any other appropriate values, parameters, or information utilized by the management module 15 during operation. The memory 91 may represent any collection and arrangement of volatile or nonvolatile, local or remote devices suitable for storing data. Examples of the memory 91 include, but are not limited to, random access memory (RAM) devices, read only memory (ROM) devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components. In some embodiments, the resource scheduling module 92 identifies new fiducial markers that have not yet been applied to the floor, selects one or more units 20F to apply the new fiducial markers to the floor, and assigns tasks to the one or more units 20F to apply the new fiducial markers to the floor. Additionally, the resource scheduling module 92 may also be responsible for generating assigned tasks associated with various management operations, such as prompting the units 20, 20F to recharge batteries or have batteries replaced, instructing inactive units 20, 20F to park in a location outside the anticipated traffic flow or a location near the anticipated site of future tasks, and/or directing the units 20, 20F selected for repair or maintenance to move towards a designated maintenance station.

The route planning module 94 receives route requests from the units 20, 20F. These route requests identify one or more destinations associated with a task the requesting unit 20, 20F is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting unit 20, 20F using the communication interface module 98.

The segment reservation module 96 receives reservation requests from the units 20, 20F attempting to move along paths generated by the route planning module 94. These reservation requests request the use of a particular portion of the workspace 70 (referred to herein as a "segment") to allow the requesting unit 20, 20F to avoid collisions with other units 20, 20F while moving across the reserved segment. In response to received reservation requests, the segment reservation module 96 transmits a reservation response granting or denying the reservation request to the requesting unit 20, 20F using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In particular embodiments, the management module 15 may communicate using communication protocols such as 802.11, Bluetooth, or Infrared Data Association (IrDA) standards. Furthermore, the management module 15 may, in particular embodiments, represent a portion of unit 20 and/or 20F or other components of the inventory system 10. In such embodiments, the communication interface module 98 may facilitate communication between the management module 15 and other parts of the same system component.

In general, the resource scheduling module 92, the route planning module 94, the segment reservation module 96, the inventory module 97, and the communication interface module 98 may each represent any appropriate hardware and/or software suitable to provide the described functionality. In addition, as noted above, the management module 15 may, in particular embodiments, represent multiple different discrete components and any or all of the resource scheduling module 92, the route planning module 94, the segment reservation module 96, the inventory module 97, and the communication interface module 98 may represent components physically separate from the remaining elements of the management module 15. Moreover, any two or more of the resource scheduling module 92, the route planning module 94, the segment reservation module 96, the inventory module 97, and the communication interface module 98 may share common components. For example, in particular embodiments, the resource scheduling module 92, the route planning module 94, the segment reservation module 96, and the inventory module 97 represent computer processes executing on the processor 90 and the communication interface module 98 comprises a wireless transmitter, a wireless receiver, and a related computer process executing on the processor 90.

Figure 4:
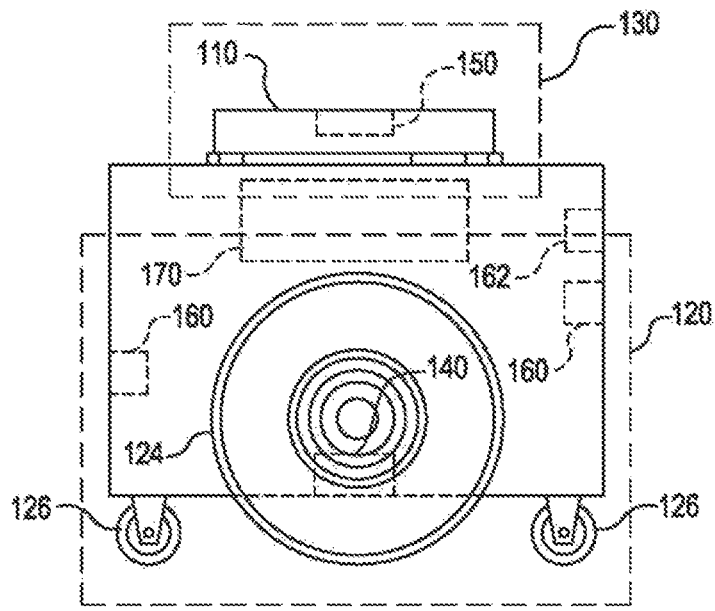
FIGS. 4 and 5 illustrate an example mobile drive unit that can be used in particular embodiments of the inventory system shown in FIG. 2.
Figure 5:
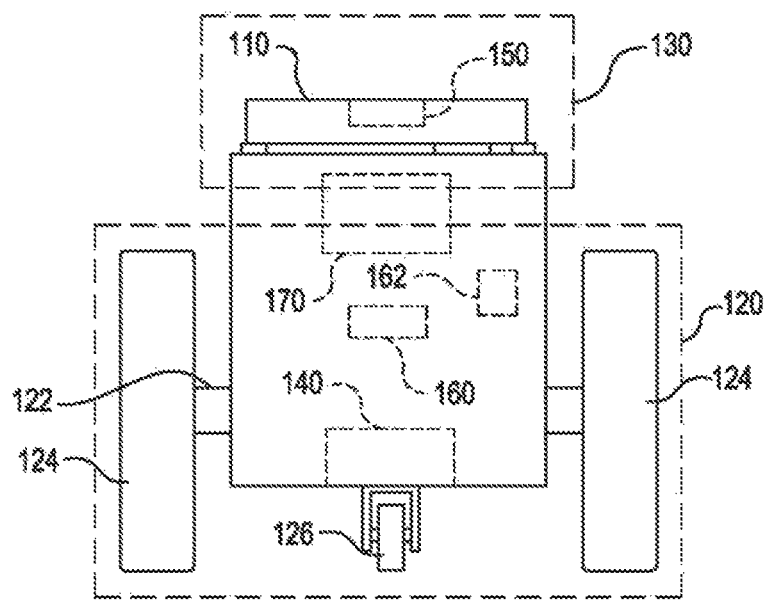

FIGS. 4 and 5 illustrate in greater detail the components of a particular embodiment of the mobile drive unit 20. In particular, FIGS. 4 and 5 include a side view and a front view of an example mobile drive unit 20. The example mobile drive unit 20 includes a docking head 110, a drive module 120, a docking actuator 130, and a control module 170. Additionally, the mobile drive unit 20 may include one or more sensors configured to generate an output that can be processed to detect or determine the location and orientation of the mobile drive unit 20, the inventory holder 30, and/or other appropriate elements of the inventory system 10. In the illustrated embodiment, the mobile drive unit 20 includes a position sensor 140, a holder sensor 150, an obstacle sensor 160, and an identification signal transmitter 162.

Figure 6:
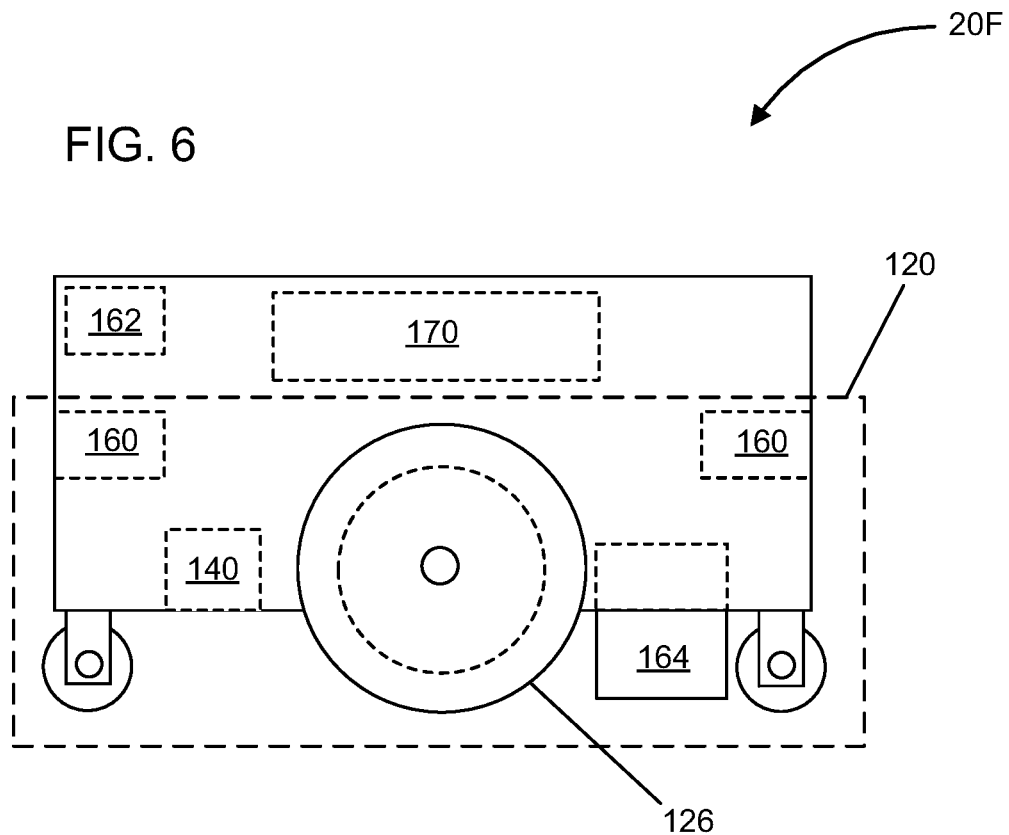
FIGS. 6 and 7 illustrate an example unmanned fiducial marker application unit configured to apply fiducial markers to a floor of a material handling facility, in accordance with some embodiments.
Figure 7:
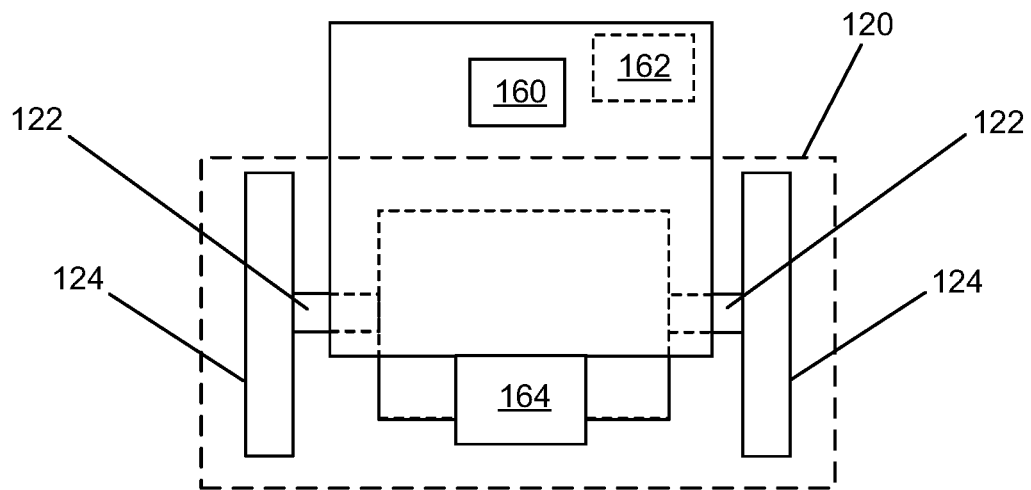

FIGS. 6 and 7 illustrate an example fiducial marker placement unit 20F configured for automated application of fiducial markers to a floor of an inventory facility such as an order fulfillment facility, in accordance with some embodiments. In particular, FIGS. 6 and 7 include a front view and a side view of the example fiducial marker placement unit 20F. The example fiducial marker placement unit 20F is configured similar to the mobile drive unit 20 and includes common and/or similar components. For example, the fiducial marker placement unit 20F includes the drive module 120 and the control module 170. Additionally, the fiducial marker placement unit 20F may include one or more sensors configured to generate an output that can be processed to determine the location and orientation of the fiducial marker placement unit 20F within the inventory facility 10. In the illustrated embodiment, the fiducial marker placement unit 20F includes the position sensor 140, the obstacle sensor 160, the identification signal transmitter 162, and a fiducial marker application assembly 164.

The fiducial marker application assembly 164 is operable to apply a fiducial marker to the floor of the material handling facility 2. In some embodiments, the fiducial marker application assembly 164 is configured to hold a stack of fiducial markers and operable to press or stamp each of the fiducial markers in the stack onto the floor of the inventory facility in a designated position and orientation. In some embodiments, the fiducial marker application assembly 164 is configured to hold a roll of fiducial markers and operable to press/roll each of the fiducial markers in the stack onto the floor of the inventory facility in a designated position and orientation. In some embodiments, the mobile drive unit 20 includes the fiducial marker application assembly 164.

In particular embodiments of the mobile drive unit 20, the docking head 110 couples the mobile drive unit 20 to an inventory holder 30 and/or supports the inventory holder 30 when the mobile drive unit 20 is docked to the inventory holder 30. The docking head 110 may additionally allow the mobile drive unit 20 to maneuver the inventory holder 30, such as by lifting the inventory holder 30, propelling the inventory holder 30, rotating the inventory holder 30, and/or moving the inventory holder 30 in any other appropriate manner. The docking head 110 may also include any appropriate combination of components, such as ribs, spikes, and/or corrugations, to facilitate such manipulation of the inventory holder 30. For example, in particular embodiments, the docking head 110 may include a high-friction portion that abuts a portion of the inventory holder 30 while the mobile drive unit 20 is docked to the inventory holder 30. In such embodiments, frictional forces created between the high-friction portion of the docking head 110 and a surface of the inventory holder 30 may induce translational and rotational movement in the inventory holder 30 when the docking head 110 moves and rotates, respectively. As a result, the mobile drive unit 20 may be able to manipulate the inventory holder 30 by moving or rotating the docking head 110, either independently or as a part of the movement of the mobile drive unit 20 as a whole.

Each of the mobile drive unit 20 and the fiducial marker placement unit 20F includes a respective drive module 120. The drive module 120 propels the mobile drive unit 20 and, when the mobile drive unit 20 and the inventory holder 30 are docked, the inventory holder 30. Likewise, the drive module 120 propels the fiducial marker placement unit 20F. The drive module 120 may represent any appropriate collection of components operable to propel the respective drive module 120 or fiducial marker placement unit 20F. For example, in the illustrated embodiment, the drive module 120 includes a pair of motorized axles 122, a pair of motorized wheels 124, and a pair of stabilizing wheels 126. One motorized wheel 124 is mounted to an end of a respective one of the motorized axles 122, and one stabilizing wheel 126 is positioned at each end of the mobile drive unit 20.

The docking actuator 130 moves the docking head 110 towards the inventory holder 30 to facilitate docking of the mobile drive unit 20 and the inventory holder 30. The docking actuator 130 may also be capable of adjusting the position or orientation of the docking head 110 in other suitable manners to facilitate docking. The docking actuator 130 may include any appropriate components, based on the configuration of the mobile drive unit 20 and the inventory holder 30, for moving the docking head 110 or otherwise adjusting the position or orientation of the docking head 110. For example, in the illustrated embodiment, the docking actuator 130 includes a motorized shaft (not shown) attached to the center of the docking head 110. The motorized shaft is operable to lift the docking head 110 as appropriate for docking with the inventory holder 30.

The drive module 120 may be configured to propel the respective mobile drive unit 20 or fiducial marker placement unit 20F in any suitable manner. For example, in the illustrated embodiments, the motorized wheels 124 are operable to rotate in a first direction to propel the unit 20, 20F in a forward direction. The motorized wheels 124 are also operable to rotate in a second direction to propel the unit 20, 20F in a backward direction. In the illustrated embodiment, the drive module 120 is also configured to rotate the unit 20, 20F by rotating the motorized wheels 124 in different directions from one another or by rotating one of the motorized wheels 124 at a different speed from the other.

The position sensor 140 represents one or more sensors, detectors, or other components suitable for determining the location of the unit 20, 20F in any appropriate manner. For example, in particular embodiments, the workspace 70 associated with the inventory system 10 includes a number of fiducial markers distributed to cover all or a portion of the workspace 70. In such embodiments, the position sensor 140 may include a camera and suitable image- and/or video-processing components, such as an appropriately-programmed digital signal processor, to allow the position sensor 140 to detect fiducial markers within the camera's field of view. The control module 170 may store location information that is updated repeatedly to reflect the position and orientation of the unit 20, 20F as determined via processing an image captured by the position sensor 140 encompassing one or more of the fiducial markers. As a result, the control module 170 can maintain an accurate indication of the location and orientation of the unit 20, 20F within the material handling facility 2 to aid in navigation when moving the unit 20, 20F within the workspace 70.

The holder sensor 150 represents one or more sensors, detectors, or other components suitable for detecting an inventory holder 30 and/or determining, in any appropriate manner, the location of an inventory holder 30, as an absolute location or as a position relative to the mobile drive unit 20. The holder sensor 150 may be capable of detecting the location of a particular portion of an inventory holder 30 or an inventory holder 30 as a whole. The mobile drive unit 20 may then use the detected information for docking with or otherwise interacting with an inventory holder 30.

The obstacle sensor 160 represents one or more sensors capable of detecting objects located in one or more different directions in which the unit 20, 20F is capable of moving. The obstacle sensor 160 may utilize any appropriate components and techniques, including optical, radar, sonar, pressure-sensing and/or other types of detection devices appropriate to detect objects located in the direction of travel of the unit 20, 20F. In particular embodiments, the obstacle sensor 160 may transmit information describing objects it detects to the control module 170 to be used by the control module 170 to identify obstacles and to take appropriate remedial actions to prevent the unit 20, 20F from colliding with obstacles and/or other objects.

The obstacle sensor 160 may also detect signals transmitted by other units 20, 20F operating in the vicinity of the unit 20, 20F. For example, in particular embodiments of the inventory system 10, one or more of the units 20, 20F may include an identification signal transmitter 162 that transmits a unit identification signal. The unit identification signal indicates to other units 20, 20F that the object transmitting the unit identification signal is in fact a unit 20, 20F. The identification signal transmitter 162 may be capable of transmitting infrared, ultraviolet, audio, visible light, radio, and/or other suitable signals that indicate to recipients that the transmitting device is a unit 20, 20F.

Additionally, in particular embodiments, the obstacle sensor 160 may also be capable of detecting state information transmitted by other units 20, 20F. For example, in particular embodiments, the identification signal transmitter 162 may be capable of including state information relating to the unit 20, 20F in the transmitted identification signal. This state information may include, but is not limited to, the position, velocity, direction, and the braking capabilities of the transmitting unit 20, 20F. In particular embodiments, the unit 20, 20F may use the state information transmitted by other units 20, 20F to avoid collisions when operating in close proximity with those other units 20, 20F.

The control module 170 monitors and/or controls operation of the drive module 120 in the unit 20, 20F and the docking actuator 130 in the unit 20. The control module 170 may also receive information from sensors such as position sensor 140 in the unit 20, 20F and the holder sensor 150 in the unit 20 and adjust the operation of drive module 120 in the unit 20, 20F, the docking actuator 130 in the unit 20, and/or other components of the unit 20, 20F based on this information. Additionally, in particular embodiments, the unit 20, 20F may be configured to communicate with a management device of the inventory system 10 and the control module 170 may receive commands transmitted to the unit 20, 20F and communicate information back to the management device utilizing appropriate communication components of the unit 20, 20F. The control module 170 may include any appropriate hardware and/or software suitable to provide the described functionality. In particular embodiments, the control module 170 includes a general-purpose microprocessor programmed to provide the described functionality.

Additionally, the control module 170 may include all or portions of the docking actuator 130, the drive module 120, the position sensor 140, and/or the holder sensor 150, and/or share components with any of these elements of the unit 20, 20F.

Moreover, in particular embodiments, the control module 170 may include hardware and software located in components that are physically distinct from the device that houses the drive module 120, the docking actuator 130, and/or the other components of the unit 20, 20F described above. For example, in particular embodiments, each unit 20, 20F operating in the inventory system 10 may be associated with a software process (referred to here as a "drive agent") operating on a server that is in communication with the device that houses the drive module 120, the docking actuator 130, and other appropriate components of the unit 20, 20F. This drive agent may be responsible for requesting and receiving tasks, requesting and receiving routes, transmitting state information associated with the unit 20, 20F, and/or otherwise interacting with the management module 15 and other components of the inventory system 10 on behalf of the device that physically houses the drive module 120, the docking actuator 130, and the other appropriate components of the unit 20, 20F. As a result, for the purposes of this description and the claims that follow, the term "mobile drive unit" and/or "fiducial marker placement unit" can further indicate software and/or hardware, such as agent processes, that provides the described functionality on behalf of the unit 20, 20F but that may be located in physically distinct devices from the drive module 120, the docking actuator 130, and/or the other components of the unit 20, 20F described above.

While FIGS. 4 and 5 illustrate a particular embodiment of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 8:
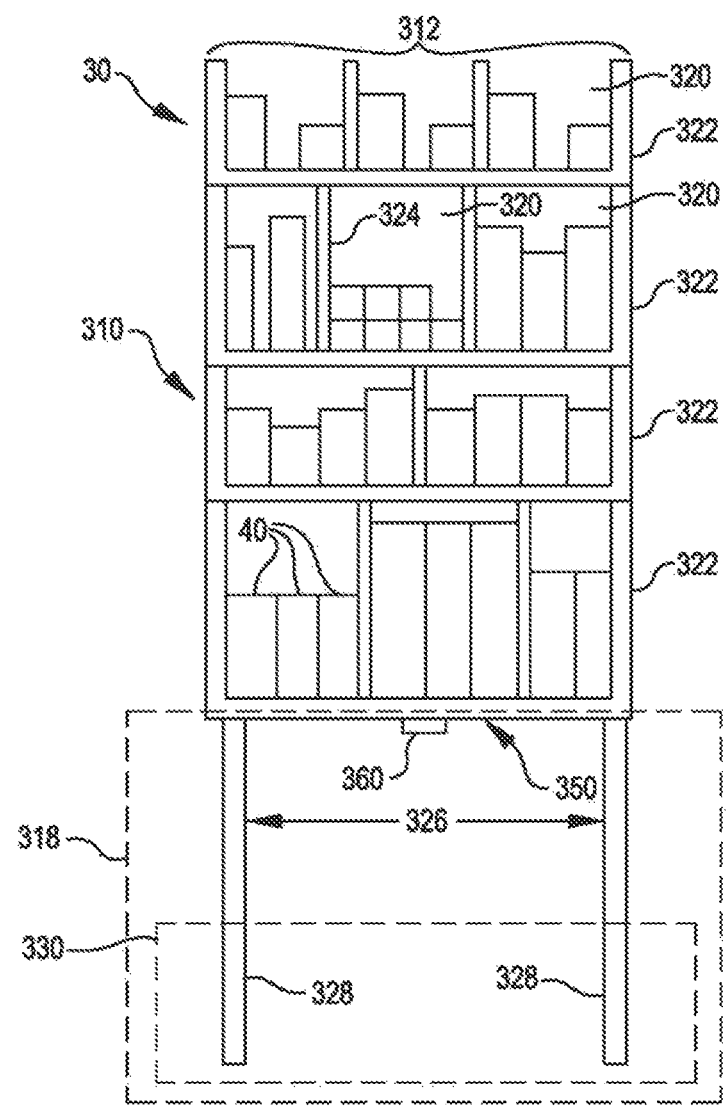
FIG. 8 illustrates an example inventory holder that can be used in particular embodiments of the inventory system shown in FIG. 2.

FIG. 8 illustrates in greater detail the components of a particular embodiment of the inventory holder 30. In particular, FIG. 8 illustrates the structure and contents of one side of an example inventory holder 30. In a particular embodiment, the inventory holder 30 may comprise any number of faces with similar or different structure. As illustrated, the inventory holder 30 includes a frame 310, a plurality of legs 328, and a docking surface 350.

The frame 310 holds inventory items 40. The frame 310 provides storage space for storing inventory items 40 external or internal to the frame 310. The storage space provided by the frame 310 may be divided into a plurality of inventory bins 320, each capable of holding inventory items 40. The inventory bins 320 may include any appropriate storage elements, such as bins, compartments, or hooks.

In a particular embodiment, the frame 310 is composed of a plurality of trays 322 stacked upon one another and attached to or stacked on a base 318. In such an embodiment, the inventory bins 320 may be formed by a plurality of adjustable dividers 324 that may be moved to resize one or more of the inventory bins 320. In alternative embodiments, the frame 310 may represent a single inventory bin 320 that includes a single tray 322 and no adjustable dividers 324. Additionally, in particular embodiments, the frame 310 may represent a load-bearing surface mounted on a mobility element 330. The inventory items 40 may be stored on such an inventory holder 30 by being placed on the frame 310. In general, the frame 310 may include storage internal and/or external storage space divided into any appropriate number of the inventory bins 320 in any appropriate manner.

Additionally, in a particular embodiment, the frame 310 may include a plurality of device openings 326 that allow the mobile drive unit 20 to position the docking head 110 adjacent the docking surface 350. The size, shape, and placement of the device openings 326 may be determined based on the size, the shape, and other characteristics of the particular embodiment of the mobile drive unit 20 and/or the inventory holder 30 utilized by the inventory system 10. For example, in the illustrated embodiment, the frame 310 includes four legs 328 that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the docking head 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in particular embodiments, the docking surface 350 may comprise a high-friction portion. When the mobile drive unit 20 and the inventory holder 30 are docked, frictional forces induced between the docking head 110 and this high-friction portion may allow the mobile drive unit 20 to maneuver the inventory holder 30. Additionally, in particular embodiments, the docking surface 350 may include appropriate components suitable to receive a portion of the docking head 110, couple the inventory holder 30 to the mobile drive unit 20, and/or facilitate control of the inventory holder 30 by the mobile drive unit 20.

A holder identifier 360 marks a predetermined portion of the inventory holder 30 and the mobile drive unit 20 may use the holder identifier 360 to align with the inventory holder 30 during docking and/or to determine the location of the inventory holder 30. More specifically, in particular embodiments, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in particular embodiments, the holder identifier 360 may represent a reflective marker that is positioned at a predetermined location on the inventory holder 30 and that the holder sensor 150 can optically detect using an suitably-configured camera.

Depending on the configuration and characteristics of the mobile drive unit 20 and the inventory system 10, the mobile drive unit 20 may move the inventory holder 30 using a variety of appropriate methods. In a particular embodiment, the mobile drive unit 20 is capable of moving the inventory holder 30 along a two-dimensional grid, combining movement along straight-line segments with ninety-degree rotations and arcing paths to transport the inventory holder 30 from a first location to a second location. Additionally, while moving, the mobile drive unit 20 may use fixed objects located in the workspace as reference points to assist in navigation. For example, in particular embodiments, the inventory system 10 includes multiple fiducial markers 450. The mobile drive unit 20 may be configured to detect the fiducial marks 450 and to determine the location of the mobile drive unit 20 and/or measure its movement based on the detection of the fiducial marks 450.

After the mobile drive unit 20 arrives at the second location, the mobile drive unit 20 may perform appropriate operations to facilitate access to the inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from the inventory holder 30 at this new location.

Figure 9:
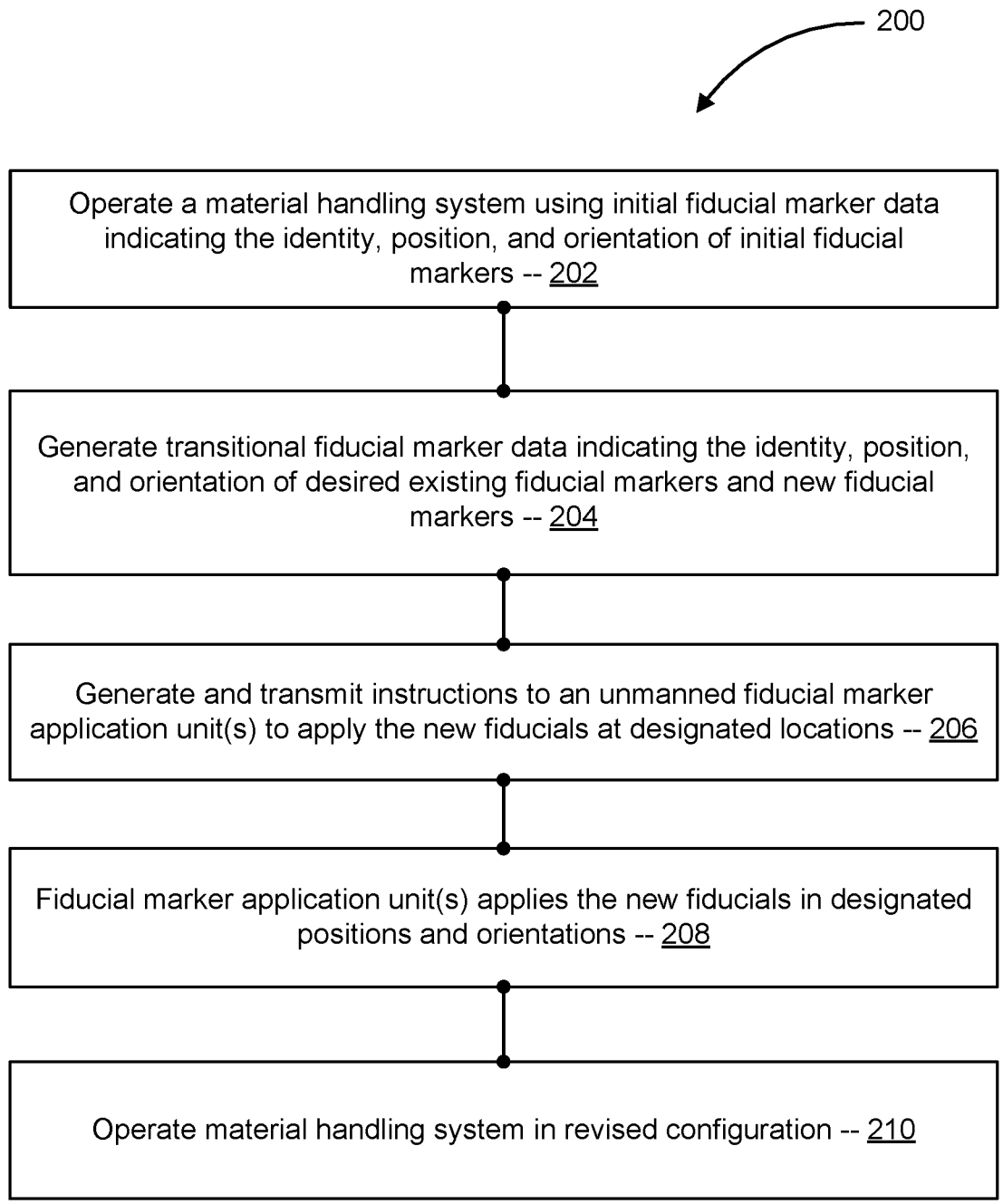
FIG. 9 is a simplified block diagram of acts of a method for automated floor expansion within a material handling facility, in accordance with some embodiments.

FIG. 9 is a simplified block diagram of acts of a method 200 for automated floor expansion within a material handling facility, such as the material handling facility 2, in accordance with some embodiments. The method 200 can be practiced using any suitable unmanned fiducial marker placement unit configured to apply a fiducial marker to a floor surface, such as the unmanned fiducial marker placement unit 20F described herein. The method 200 is suitable for use to revise a material handling facility (e.g., the material handling facility 2 described herein) from an initial configuration (having an initial floor area over which an initial set of fiducial markers distributed over the initial floor area) to a revised configuration (having a revised set of fiducial markers distributed over a revised floor area that includes a new floor area and includes at least some (if not all) of the initial floor area). The revised set of fiducial markers includes one or more new fiducial markers distributed over the new floor area and some or all of the initial fiducial markers distributed over the portion of the initial floor area (if any) incorporated into the revised floor area.

In act 202, a material handling system (e.g., the inventory system 10 described herein) is operated in an initial configuration using initial fiducial marker data indicating the position, the orientation, and the identity of each of initial fiducial markers distributed over an initial floor area of a material handling facility (e.g., the material handling facility 2 described herein). In some embodiments, the initial fiducial marker data amounts to an initial virtual map (e.g., M1) of the initial fiducial markers distributed over the initial floor area of the material handling facility. The operation of the material handling system in the initial configuration can include processing an image captured by an unmanned drive unit (e.g., the mobile drive unit 20 described herein, the unmanned fiducial marker placement unit 20F described herein) to determine the position and orientation of the unmanned drive unit within the initial floor area based on the position, the orientation, and the identify of one or more initial fiducial markers encompassed within the captured image. The determined position and orientation of the unmanned drive unit can then be used to update the position and orientation of the unmanned drive unit within the initial floor area as tracked by the unmanned drive unit to facilitate accurate navigation of the unmanned drive unit within the initial floor area.

In act 204, transitional fiducial marker data is generated that indicates the identify, the position, and the orientation of the new fiducial markers and any of the initial fiducial markers that make up the revised set of fiducial markers. In some embodiments, the transitional fiducial marker data further indicates, for each of the new fiducial markers, whether the new fiducial marker has not yet been placed onto the new floor area or has already been placed on the new floor area. In some embodiments, the transitional fiducial marker data amounts to an interim virtual map (e.g., M1') of the new fiducial markers to be placed on the floor and of the initial fiducial markers included in the revised set of fiducial markers.

In act 206, the material handling system generates and transmits instructions to the unmanned fiducial marker placement unit(s) to apply each of the new fiducial markers to the new floor areas in the designated position and orientation for the respective new fiducial marker. In embodiments in which the transitional fiducial marker data indicates the deployment status of the new fiducial markers, the material handling system can process the transitional fiducial marker data to identify which of the new fiducial markers have not yet been placed onto the new floor area.

In act 208, the unmanned fiducial marker placement unit(s) apply each of the new fiducial markers in the new floor area in the position and orientation indicated by the transitional fiducial marker data for the respective new fiducial marker. In embodiments in which the transitional fiducial marker data indicates the deployment status of the new fiducial markers, the material handling system can update the transitional fiducial marker data as the new fiducial markers are applied to reflect the deployment status of the new fiducial markers. Following application of all of the new fiducial markers, the material handling system can employ the updated transitional fiducial marker data to facilitate navigation of the units 20, 20F in the material handling facility. In some embodiments, the updated transitional fiducial marker data amounts to a virtual map (e.g., M2) of the updated fiducial markers within the material handling facility.

Following application of all of the new fiducial markers in the new floor area, the material handling system can be operated in the revised configuration (act 210). The operation of the material handling system in the revised configuration can include processing an image captured by an unmanned drive unit (e.g., the mobile drive unit 20 described herein, the unmanned fiducial marker placement unit 20F described herein) to determine the position and orientation of the unmanned drive unit within the revised floor area based on the position, the orientation, and the identify of one or more fiducial markers encompassed within the captured image. The determined position and orientation of the unmanned drive unit can then be used to update the position and orientation of the unmanned drive unit within the revised floor area as tracked by the unmanned drive unit to facilitate accurate navigation of the unmanned drive unit within the revised floor area.

Some or all of the method 200 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
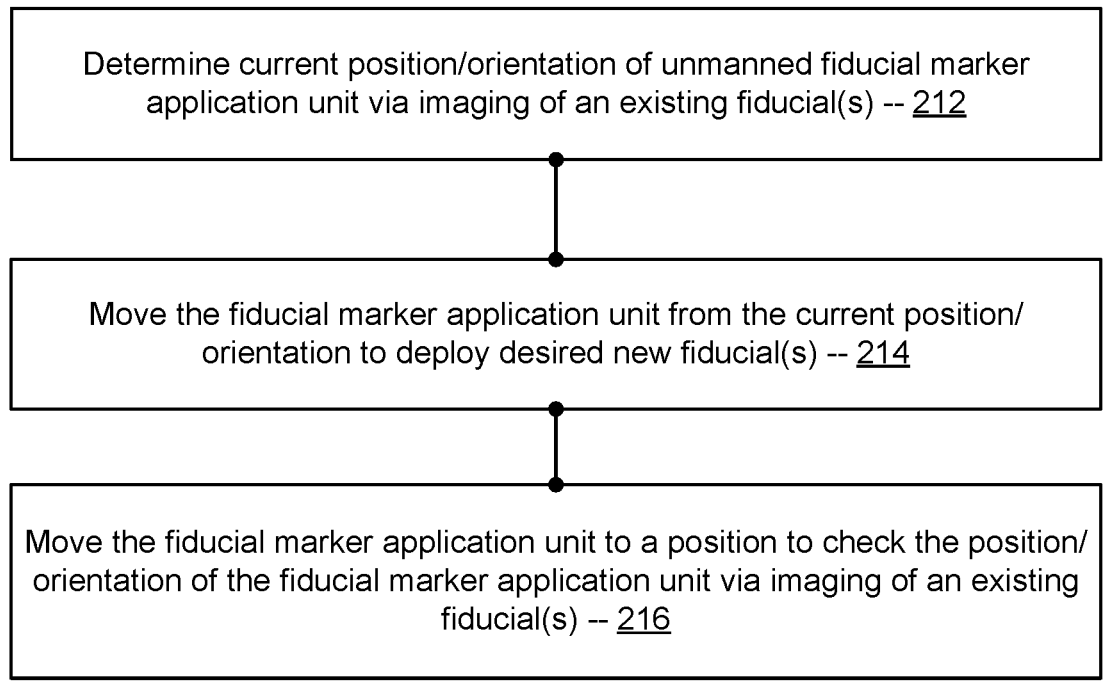
FIG. 10 is a simplified block diagram of acts that can be accomplished in conjunction with the method of FIG. 9.

FIG. 10 is a simplified block diagram of acts that can be accomplished in conjunction with the method 200, in accordance with some embodiment. The acts illustrated in FIG. 10 can be used to ensure accurate placement of the new fiducial markers relative to the initial fiducial markers. In act 212, the position and orientation of the unmanned fiducial marker placement unit within the initial floor area is determined via processing of an image captured by the unmanned fiducial marker placement unit that encompasses one or more of the initial fiducial markers as described herein. In act 214, the unmanned fiducial marker placement unit is moved from the position and orientation determined in act 212 to the position(s) and orientation(s) indicated by the transitional fiducial marker data for each respective new fiducial marker and applies each new fiducial marker to the new floor area in the designated position and orientation for the respective new fiducial marker. In act 216, following placement of the new fiducial marker(s) in act 214, the unmanned fiducial marker placement unit is moved to a position to capture an image encompassing one or more of the initial fiducial markers, the captured image is processed to determine the position and the orientation of the unmanned fiducial marker placement unit when the image was captured, and the determined position and orientation of the fiducial marker placement unit is compared with the position and orientation of the fiducial marker placement unit as tracked by the fiducial marker placement unit from the position and orientation determined in act 212 to assess the accuracy of the placement of the new fiducial marker(s) in act 214. In some embodiments, if the position and the orientation of the fiducial placement unit determined via processing the captured image encompassing one or more of the initial fiducial markers agrees within a desired tolerance with the position and orientation of the fiducial marker placement unit as tracked by the fiducial marker placement unit from the position and orientation determined in act 212, the transitional fiducial data can be revised to indicate that the new fiducials have been deployed in the new floor area to a desired degree of accuracy. In some embodiments, if the position and the orientation of the fiducial placement unit determined via processing the captured image encompassing one or more of the initial fiducial markers does not agree within a desired tolerance with the position and orientation of the fiducial marker placement unit as tracked by the fiducial marker placement unit from the position and orientation determined in act 212, the transitional fiducial data can be revised to indicate that the new fiducials have been deployed in the new floor area to an undesired degree of accuracy.

Figure 11:
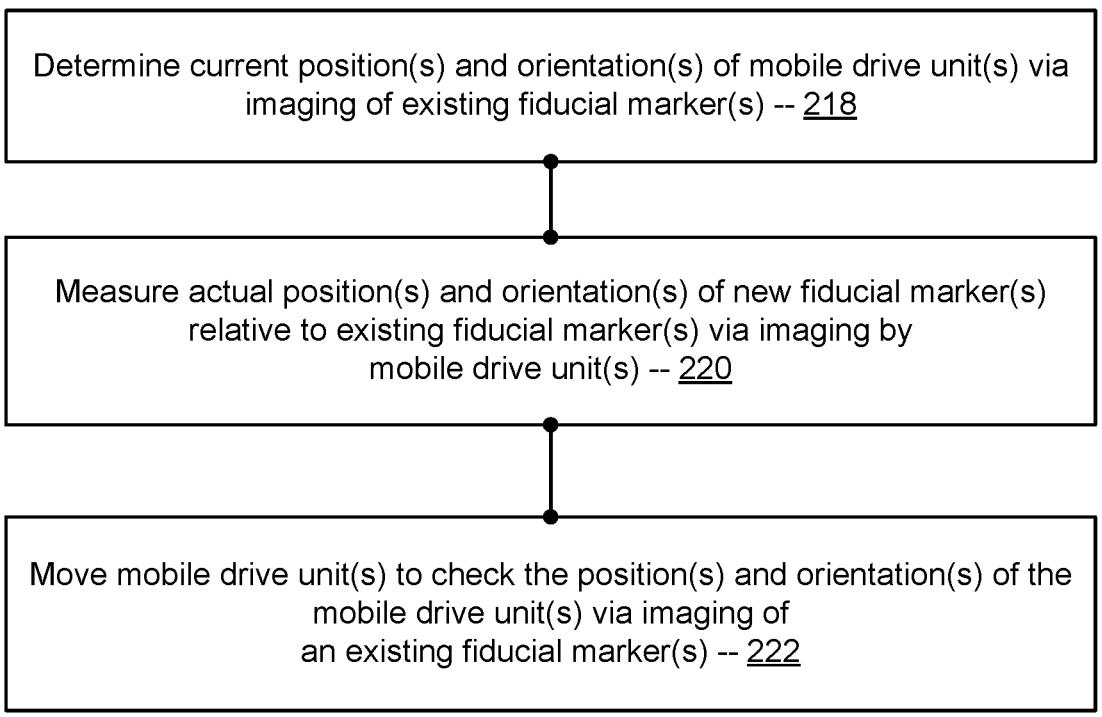
FIG. 11 is a simplified block diagram of acts that can be accomplished in conjunction with the method of FIG. 9.

FIG. 11 is a simplified block diagram of acts that can be accomplished in conjunction with the method 200, in accordance with some embodiments. The acts illustrated in FIG. 11 can be used to measure the as applied position and orientation of the new fiducial markers in the new floor area and update the transitional fiducial marker data to reflect the measured as applied position and orientation of the new fiducial markers in the new floor area. In act 218, the position and orientation of the unmanned fiducial marker placement unit within the initial floor area is determined via processing of an image captured by the unmanned fiducial marker placement unit that encompasses one or more of the initial fiducial markers as described herein.

In act 220, the unmanned fiducial marker placement unit is moved from the position and orientation determined in act 218 to position the unmanned fiducial marker placement unit to capture an image of a respective one of the new fiducial markers. The image is processed to measure the as applied position and orientation of the respective new fiducial based on the position and orientation of the respective new fiducial in the processed image and the position and orientation of the unmanned fiducial marker placement unit relative to the position determined in act 218 as tracked by the unmanned fiducial marker placement unit. In some embodiments, the unmanned fiducial marker placement unit is sequentially moved from its current location to measure the as applied position and orientation of the remaining new fiducial markers using the same image and tracking based measurement approach.

In act 222, following the measurement of the as applied locations of the new fiducial marker(s) in act 220, the unmanned fiducial marker placement unit is moved to a position to capture an image encompassing one or more of the initial fiducial markers, the captured image is processed to determine the position and the orientation of the unmanned fiducial marker placement unit when the image was captured, and the determined position and orientation of the fiducial marker placement unit is compared with the position and orientation of the fiducial marker placement unit as tracked by the fiducial marker placement unit from the position and orientation determined in act 218 to assess the accuracy of the measurement of the as applied position and orientation of the new fiducial marker(s) in act 220. In some embodiments, if the position and the orientation of the fiducial placement unit determined via processing the captured image encompassing one or more of the initial fiducial markers agrees within a desired tolerance with the position and orientation of the fiducial marker placement unit as tracked by the fiducial marker placement unit from the position and orientation determined in act 212, the transitional fiducial data can be revised to reflect the measured as applied position and orientation of the new fiducial markers. In some embodiments, if the position and the orientation of the fiducial placement unit determined via processing the captured image encompassing one or more of the initial fiducial markers does not agree within a desired tolerance with the position and orientation of the fiducial marker placement unit as tracked by the fiducial marker placement unit from the position and orientation determined in act 212, acts 218 through 222 can be repeated until sufficiently accurate measurements of the as applied position and orientation for each of the new fiducial markers is obtained.

Figure 12:
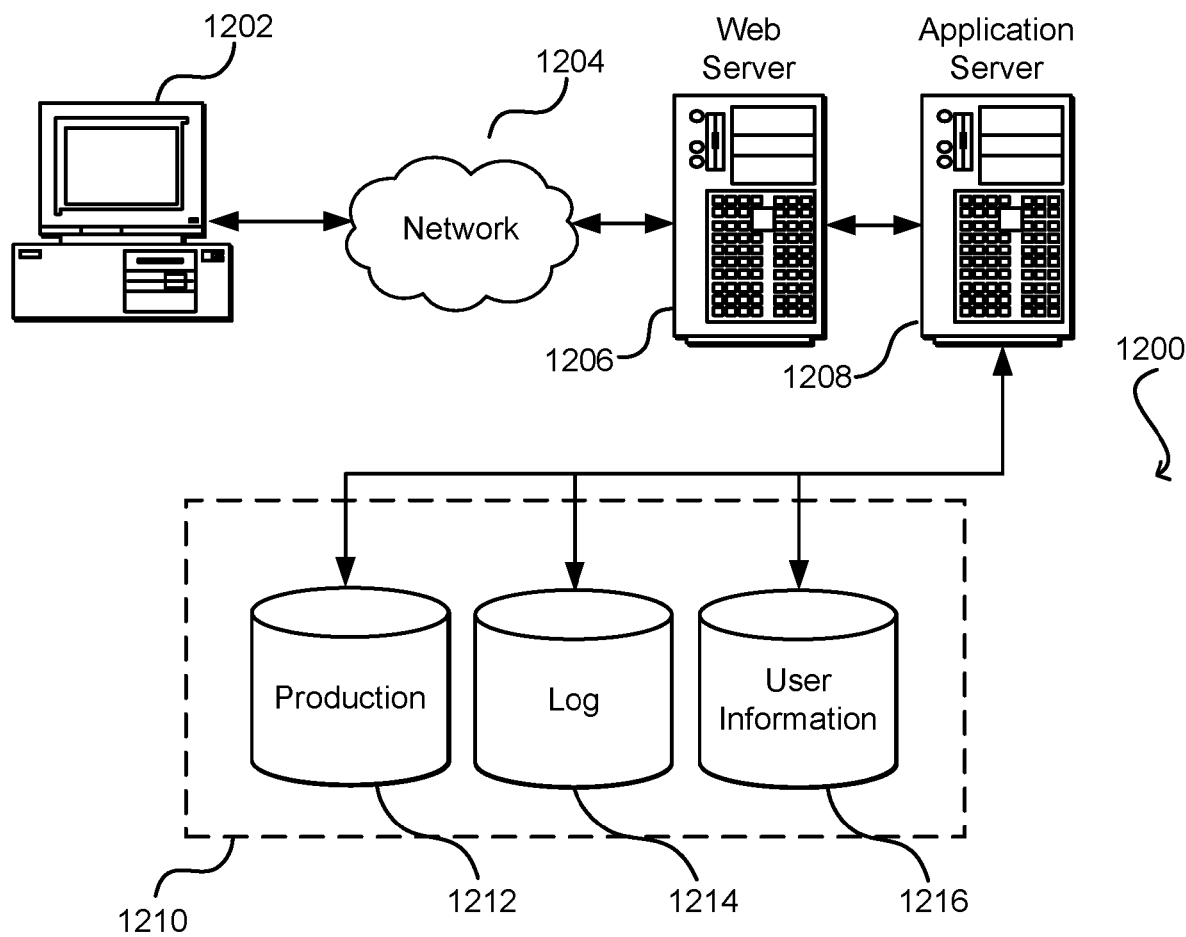
FIG. 12 illustrates aspects of an example environment for implementing aspects in accordance with various embodiments.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of modifying an inventory facility having a floor and initial fiducial markers distributed on the floor, the method comprising:

receiving new fiducial marker data indicative of a location for each of new fiducial markers to be applied to the floor;

capturing a first image encompassing one or more of the initial fiducial markers using a first image capture device mounted to an unmanned fiducial marker application unit;

processing the first image, based on initial fiducial marker data locating the initial fiducial markers within the inventory facility, to locate the unmanned fiducial marker application unit at a first location within the inventory facility;

instructing the unmanned fiducial marker application unit to move from the first location to apply the new fiducial markers to the floor in accordance with the new fiducial marker data;

applying, by the unmanned fiducial marker application unit, the new fiducial markers to the floor;

capturing a second image encompassing at least one of the new fiducial markers using a second image capture device mounted to an unmanned drive unit configured to transport a portable inventory holder within the inventory facility;

processing the second image, based on the new fiducial marker data, to locate the unmanned drive unit at a second location within the inventory facility;

after applying the new fiducial markers to the floor by the unmanned fiducial marker application unit, capturing a third image encompassing one or more of the initial fiducial markers using the first image capture device;

processing the third image, based on the initial fiducial marker data, to locate the unmanned fiducial marker application unit at a third location within the inventory facility;

tracking movement of the unmanned fiducial marker application unit from the first location to the third location; and comparing the tracked movement of the unmanned fiducial marker application unit from the first location to the third location with the first and third locations to assess accuracy of placement of the new fiducial markers applied to the floor by the unmanned fiducial marker application unit.

2. The computer-implemented method of claim 1, further comprising receiving status data for the new fiducial markers indicating, for each of the new fiducial markers, whether the new fiducial marker has been applied to the floor.

3. The computer-implemented method of claim 1, further comprising:
determining a path to move the unmanned drive unit from the second location to a selected location within the inventory facility; and
causing the unmanned drive unit to move the portable inventory holder along the path from the second location to the selected location.

4. The computer-implemented method of claim 1, further comprising updating the new fiducial marker data based on the comparison between the tracked movement of the unmanned fiducial marker application unit from the first location to the third location and the first and third locations.

5. The computer-implemented method of claim 1, further comprising:
capturing a fourth image encompassing at least one of the initial fiducial markers using the second image capture device;
processing the fourth image, based on the initial fiducial marker data, to locate the unmanned drive unit at a fourth location within the inventory facility;
capturing a fifth image encompassing at least one of the new fiducial markers using the second image capture device;
processing the fifth image, based on the new fiducial marker data, to locate the unmanned drive unit at a fifth location within the inventory facility;
tracking movement of the unmanned drive unit from the fourth location to the fifth location; and
comparing the tracked movement of the unmanned drive unit from the fourth location to the fifth location with the fourth and fifth locations to assess deviation between the new fiducial marker data and an observed location for one of the new fiducial markers.

6. The computer-implemented method of claim 5, further comprising updating the new fiducial marker data based on the comparison between the tracked movement of the unmanned drive unit from the fourth location to the fifth location and the fourth and fifth locations.

7. A computer-implemented method of modifying a material handling facility having a floor and one or more initial fiducial markers distributed on the floor, the method comprising:
receiving new fiducial marker data indicative of a location for each of new fiducial markers to be applied to the floor;
positioning an unmanned fiducial marker application unit at a first location within the material handling facility;

instructing the unmanned fiducial marker application unit to move from the first location to apply the new fiducial markers to the floor in accordance with the new fiducial marker data;

capturing a second image encompassing at least one of the initial fiducial markers using a second image capture device mounted to an unmanned drive unit;

processing the second image, based on initial fiducial marker data indicative of a location in the material handling facility of each of a subset of the initial fiducial markers, to locate the unmanned drive unit at a second location within the material handling facility;

capturing a third image encompassing at least one of the new fiducial markers using the second image capture device;

processing the third image, based on the new fiducial marker data, to locate the unmanned drive unit at a third location within the material handling facility;

tracking movement of the unmanned drive unit from the second location to the third location; and comparing the tracked movement of the unmanned drive unit from the second location to the third location with the second and third locations to assess deviation between the new fiducial marker data and an observed location for one of the new fiducial markers.

8. The computer-implemented method of claim 7, wherein receiving the new fiducial marker data comprises receiving the initial fiducial marker data.

9. The computer-implemented method of claim 7, further comprising receiving status data for the new fiducial markers indicating, for each of the new fiducial markers, whether the new fiducial marker has been applied to the floor.

10. The computer-implemented method of claim 7, wherein the positioning the unmanned fiducial marker application unit at the first location comprises: capturing a first image encompassing one or more of the initial fiducial markers using a first image capture device mounted to the unmanned fiducial marker application unit; and processing the first image, based on the initial fiducial marker data, to locate the unmanned fiducial marker application unit relative to the first location.

11. A system for managing inventory items, the system comprising: an unmanned fiducial marker application unit comprising a first image capture device oriented substantially toward a floor of an inventory facility; initial fiducial markers distributed in a pattern on the floor of the inventory facility; at least one tangible memory device; and at least one processor configured to execute non-transitory instructions stored by the at least one tangible memory device, the non-transitory instructions being configured to cause the at least one processor to: receive new fiducial marker data indicative of a location for each of new fiducial markers to be applied to the floor; instruct the unmanned fiducial marker application unit to apply the new fiducial markers to the floor in accordance with the new fiducial marker data; cause the at least one processor to process a first image of the floor captured by the first image capture device, based on initial fiducial data indicative of the location of one or more initial fiducial markers encompassed by the first image, to locate the unmanned fiducial marker application unit at a first location within the inventory facility; process a third image of the floor captured by the first image capture device, based on the initial fiducial marker data indicative of a location in the inventory facility of each of a subset of the initial fiducial markers, to locate the unmanned fiducial marker application unit at a third location within the inventory facility, the third image encompassing one or more of the initial fiducial markers; and compare a tracked movement of the unmanned fiducial marker application unit from the first location to the third location with the first and third locations to assess accuracy of placement of the new fiducial markers applied to the floor by the unmanned fiducial marker application unit.

12. The system of claim 11, wherein the non-transitory instructions are further configured to cause the at least one processor to:
 process a second image of the floor captured by a second image capture device mounted to an unmanned drive unit configured to transport an inventory holder within the inventory facility, based on the new fiducial marker data, to locate the unmanned drive unit at a second location within the inventory facility, the second image encompassing at least one of the new fiducial markers;
 determine a path to move the unmanned drive unit from the second location to a selected location within the inventory facility; and
 cause the unmanned drive unit to move the portable inventory holder along the path from the second location to the selected location.

13. The system of claim 12, wherein the non-transitory instructions are configured to cause the at least one processor to:
 process a fourth image of the floor captured by the second image capture device, based on the initial fiducial marker data, to locate the unmanned drive unit at a fourth location within the inventory facility, the fourth image encompassing at least one of the initial fiducial markers;
 process a fifth image of the floor captured by the second image capture device, based on the new fiducial marker data, to locate the unmanned drive unit at a fifth location within the inventory facility, the fifth image encompassing at least one of the new fiducial markers; and
 compare a tracked movement of the unmanned drive unit from the fourth location to the fifth location with the fourth and fifth locations to assess deviation between the new fiducial marker data and an observed location for one of the new fiducial markers.

14. The system of claim 13, wherein the non-transitory instructions are configured to cause the at least one processor to update the new fiducial marker data based on the comparison between the tracked movement of the unmanned drive unit from the fourth location to the fifth location and the fourth and fifth locations.

15. The system of claim 11, wherein the new fiducial marker data comprises the initial fiducial marker data.

16. The system of claim 11, wherein the non-transitory instructions are configured to cause the at least one processor to receive status data for the new fiducial markers indicating, for each of the new fiducial markers, whether the new fiducial marker has been applied to the floor.

17. The system of claim 11, wherein the non-transitory instructions are configured to cause the at least one processor to update the new fiducial marker data based on the comparison between the tracked movement of the unmanned fiducial marker application unit from the first location to the third location and the first and third locations.

\* \* \* \* \*